A. KRIEG.
PLOW LIFT.
APPLICATION FILED MAR. 26, 1917.
1,367,607.
Patented Feb. 8, 1921.
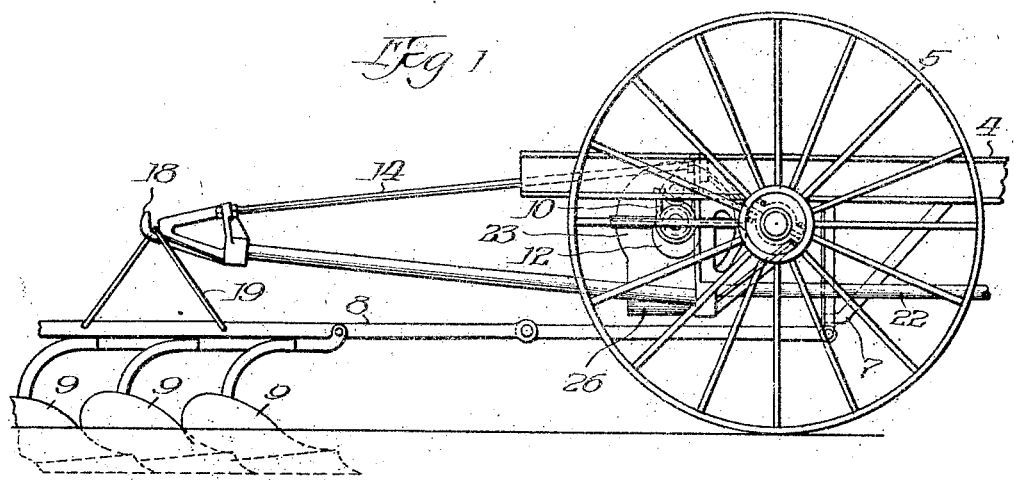
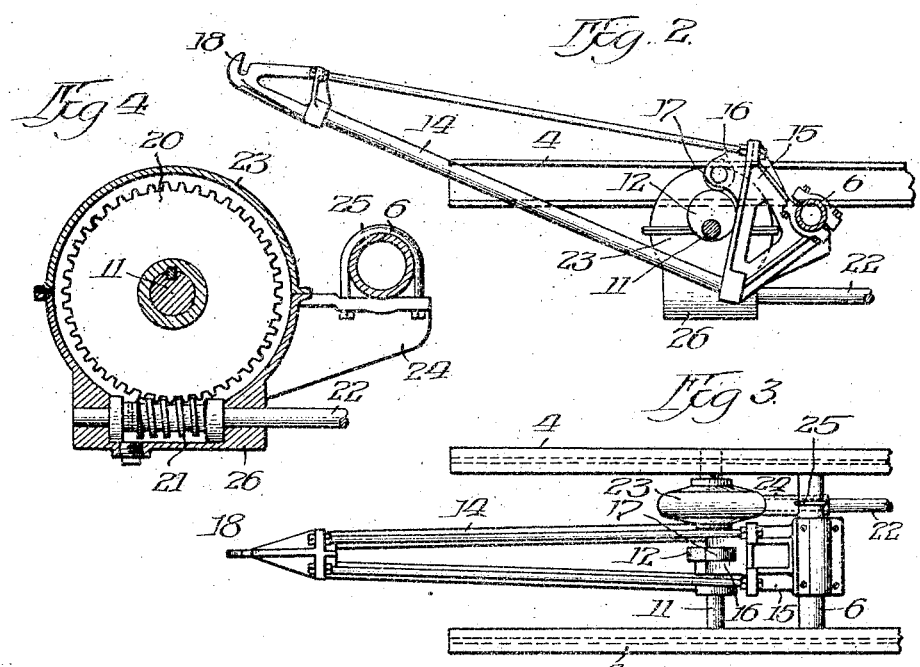
Witness
Ed C Davison
Inventor
Alfred Krieg.
By Pond + Wilson
Attys.

UNITED STATES PATENT OFFICE.

ALFRED KRIEG, OF MINNEAPOLIS, MINNESOTA, ASSIGNOR TO EMERSON-BRANTINGHAM COMPANY, OF ROCKFORD, ILLINOIS, A CORPORATION OF ILLINOIS.

PLOW-LIFT.

1,367,607.   Specification of Letters Patent.   Patented Feb. 8, 1921.

Application filed March 26, 1917. Serial No. 157,540.

*To all whom it may concern:*

Be it known that I, ALFRED KRIEG, a citizen of the United States, residing at Minneapolis, in the county of Hennepin and State of Minnesota, have invented certain new and useful Improvements in Plow-Lifts, of which the following is a specification.

This invention relates in general to the art of tractor-operated plows, and has reference more particularly to a new and improved power-operated plow lift of the type illustrated by U. S. Letters Patent to Edward R. Greer, No. 1,199,005, dated Sept. 19, 1916.

The principal object of the invention is to provide an improved and simplified mechanism of the self-locking type for raising and lowering the boom from which the plow frame is suspended.

Other objects and advantages of the invention will be readily apparent to those skilled in the art from a consideration of the following description taken in connection with the accompanying drawings, wherein—

Figure 1 is a side elevation of the rear end of a tractor showing my improved plow lift applied thereto.

Fig. 2 is a similar view partly in section and omitting the plow frame, and showing the boom in fully elevated position wherein the plows are raised clear of the ground.

Fig. 3 is a top plan view of Fig. 2.

Fig. 4 is a sectional view through the casing of the worm gear operating and locking mechanism of the lift.

Since my present improvements relate entirely to the mechanism for actuating the lifting arm or boom, I have shown the portions of the tractor and the plow frame and plows somewhat diagrammatically in order to simplify the illustration. 4 designates generally the tractor frame, 5 one of the rear wheels thereof, and 6 the rear axle. Suspended from the frame 4 is a bracket 7 to which the plow frame 8 carrying a gang of plows 9 is pivotally attached with capacity for both lateral and up and down swinging movement of the plow frame 8.

Supported in bearings 10 suspended from the main side bars of the frame 4 is a transverse shaft 11, fast on which is a cam herein shown as taking the form of an ordinary circular eccentric disk 12. On the rear axle 6 is fulcrumed with capacity for vertical swinging movement the forward end of a lifting lever or boom designated as an entirety by 14. At its pivoted end the boom 14 is preferably constructed with a generally triangular shape base-piece or bracket 15, and this bracket is provided with an extension or nose-piece 16, which overhangs the cam 12 and is preferably equipped with a roller 17 that rides on the periphery of the cam. At its rear end the boom 14 is equipped with the usual hook 18 over which passes the chain 19 by which the plow frame 8 is suspended from the boom.

The cam shaft 11 is operated through the agency of a worm gear 20, the hub of which is keyed to the shaft 11 as shown in Fig. 4, and a worm 21 drivingly engaging the worm gear 20 and mounted on a shaft 22 which is driven from the tractor engine through clutch controlled driving mechanism not herein shown, but which may be similar to that shown and described in the patent to Greer, No. 1,199,005 hereinabove referred to. The worm gear 20 is housed within a casing 23, the hubs of which latter are supported on the shaft 11, the casing having a forward extension or bracket 24 that is rigidly connected to the axle 6 by a U-bolt 25. By this means the casing 23 is rigidly held against turning on the rock shaft 11. The portion of the shaft 22 carrying the worm gear 21 is conveniently journaled in a depending extension 26 of the gear casing 23, as clearly shown in Fig. 4.

In Fig. 1, the boom is shown in its fully lowered position, and in Fig. 2, in its fully raised position. When the plows are to be lifted clear of the ground, the operator clutches the worm shaft 22 to the tractor motor, thereby turning the cam shaft 11 and eccentric 12 through substantially a half turn, or less, depending upon the height to which the plows are to be raised. The worm gear operating mechanism being self-locking, holds the boom at any point to which it may have been elevated or lowered by the cam 12 without necessitating the provision of any separate means for locking it in elevated position.

I am aware that it has heretofore been proposed to employ lifting levers that are pivotally mounted intermediate their ends, and are actuated by cams or cranks engaging their free ends. By employing a lever of the third class and mounting the same on a fulcrum shaft (in this case the rear axle) that is disposed forwardly of the operating shaft, I am enabled to shorten the total length of the machine and secure a simpler and more compact structure.

I claim:

In a mechanism of the class described, the combination of a tractor having a through axle, a lifting lever fulcrumed at its forward end on the axle and extending rearwardly beyond the tractor and adapted for lifting at its rear end, and a power operated cam engaging the lever intermediate its ends for lifting the rear end of the lever.

ALFRED KRIEG.